July 5, 1938.  H. D. GEYER  2,122,937
FREEZING TRAY
Filed July 2, 1936   2 Sheets—Sheet 1
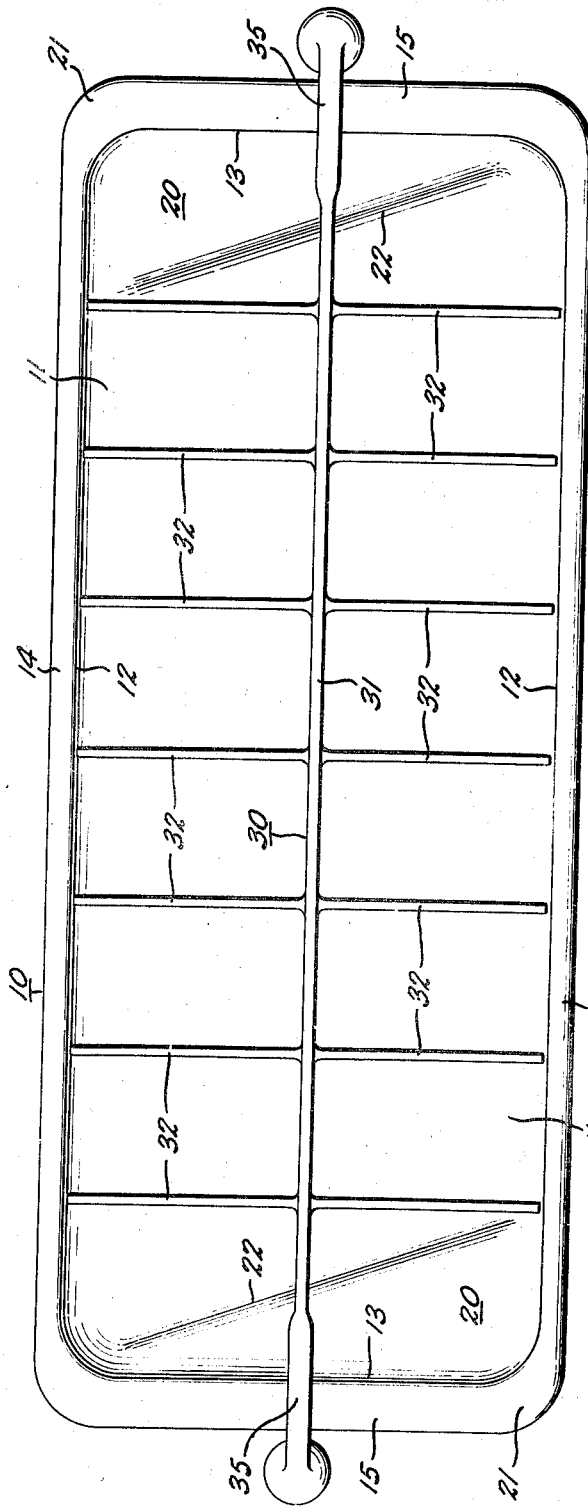
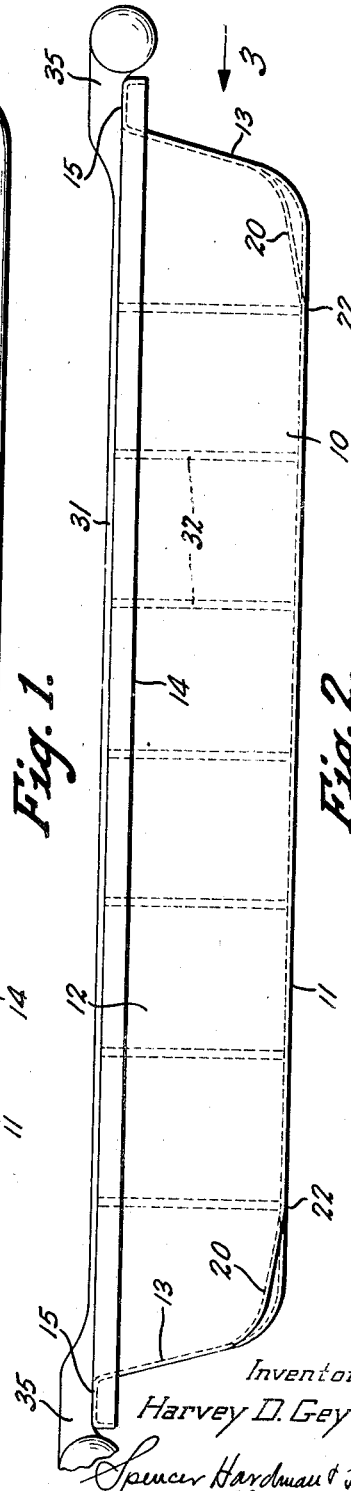
Inventor
Harvey D. Geyer
Spencer Hardman & John
His Attorneys July 5, 1938.    H. D. GEYER    2,122,937
FREEZING TRAY
Filed July 2, 1936    2 Sheets-Sheet 2

Inventor
Harvey D. Geyer
By Spencer Hardman & Fehr
His Attorneys

Patented July 5, 1938

2,122,937

UNITED STATES PATENT OFFICE 2,122,937

FREEZING TRAY

Harvey D. Geyer, Dayton, Ohio, assignor to General Motors Corporation, Detroit, Mich., a corporation of Delaware Application July 2, 1936, Serial No. 88,559

7 Claims. (Cl. 62—108.5)

This invention relates to freezing trays such as are adapted for use in household refrigerators for freezing small blocks of ice for table use.

An object of this invention is to provide a flexible metal freezing pan which may be easily distorted by hand to a limited degree so as to free the frozen bond between the metal pan and its contents and thereby facilitate the removal of the frozen contents.

A more specific object is to provide a flexible metal pan having such shape that when filled with its frozen contents it may be set upon a flat surface and readily distorted by the hands by downward pressure on two of its diagonally opposed corners so as to free the frozen bond between the contents and the pan. An important feature of this invention is the simplicity of structure of the flexible metal pan and its consequent economy of manufacture.

Distortable flexible metal freezing pans have been proposed heretofore but they have been of relatively complicated design and have required quite skillful operation to effectively free the frozen contents without injury either to the metal pan or to the hands of the operator. The tray of this invention can be very easily properly flexed by a woman or child without danger of injury to the hands due to improperly grasping the tray, since the tray is simply set upon a table or the like and pressed downwardly at opposite corners without grasping the tray with the fingers at all. Also there will be no danger of over-distortion of the metal pan thereby giving it a permanent set, since there is a very definite limit to the degree of distortion which can be given the pan of this invention by pressing down its diagonally opposed corners. If a metal pan be given a permanent set, even in only slightly distorted form, its bottom wall will not thereafter lie flat upon the usual metal support in the freezing compartment, which will greatly reduce the rapidity of freezing.

Another object of this invention is to provide the combination of an easily twisted metal container pan and a flexible soft rubber grid therefor of such design that after the frozen contents have been loosened from the pan a portion of the grid may be lifted from the pan and the ice blocks removed therefrom without removing the remaining portion of the grid and ice from the pan. This obviously results in a material saving of ice blocks when only a few are desired at one time.

Further objects and advantages of the present invention will be apparent from the following description, reference being had to the accompanying drawings wherein a preferred embodiment of the present invention is clearly shown.

In the drawings:

Fig. 1 is a plan view of an ice tray made according to this invention.

Fig. 2 is a side elevation of Fig. 1.

Similar reference characters refer to similar parts throughout the several views.

Figure 3:
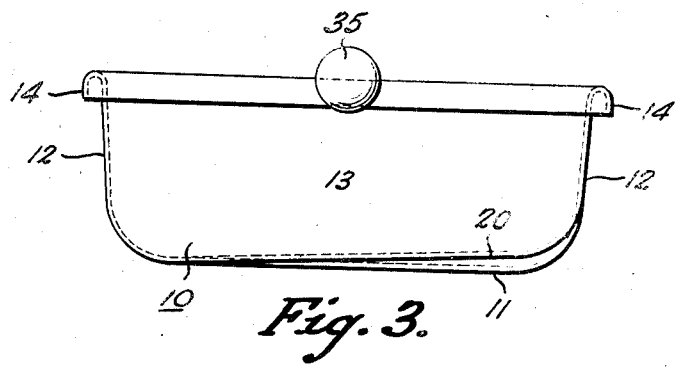
Fig. 3 is an end elevation taken in the direction of arrow 3 of Fig. 2.

The flexible metal pan 10 is preferably made from flat sheet metal by a drawing or stamping operation in a well-known manner so as to provide a bottom wall 11, two side walls 12, and two end walls 13 all integral. Preferably the upper edges of the side walls 12 are turned downwardly to form the stiffening flanges 14, and the upper edges of the end walls 13 extend horizontally outwardly a substantial distance and then downwardly to form the quite stiff horizontal end flanges 15 which serve as substantial bearing areas for the pressure of the hands during the operation shown in Fig. 4. Of course if desired these hand bearing flanges 15 can be made wider than as illustrated in the drawings, but I have found that the relative widths of flanges 15 as illustrated are ample to provide sufficient bearing areas for the hands for the flexing operation shown in Fig. 4 without undue pressure on the engaging portions of the hands.

Now the essential feature of the flexible metal pan of this invention is the raised corner areas 20 of the flexible bottom wall 11 at two diagonally opposed corners 21 of the pan. Preferably these raised areas 20 slope upwardly toward the corners 21 at a small angle beginning at the two lines 22 which extend angularly across the corners and define raised portions 20 having such substantial areas that the entire pan 10 will be slightly twisted when these corner areas 20 are forced downwardly into contact with the plane surface upon which the pan sets. The angular lines 22 are preferably parallel to each other but not parallel to any of the division walls of the flexible rubber grid 30 which divides the frozen contents of pan 10 into ice blocks of convenient size for table use.

Figure 5:
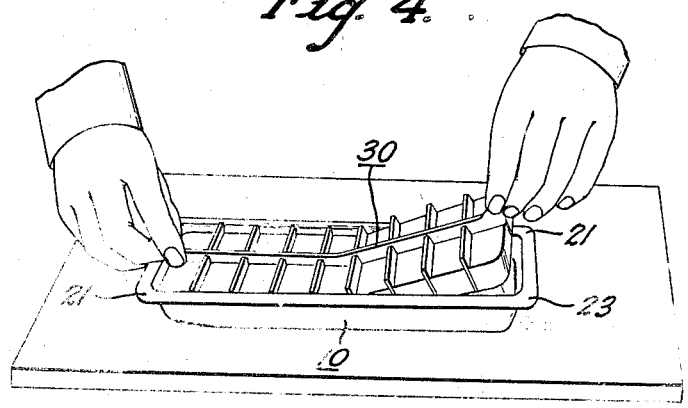
Fig. 5 illustrates the removal of the grid and ice blocks from the pan after the operation shown in Fig. 4.

The one-piece flexible rubber grid 30 shown in the drawings has a central longitudinal division wall 31 and a series of integrally molded transverse division walls 32 projecting laterally therefrom and forming two rows of ice block compartments each having at least one open side and the four corner compartments having two open sides. The central flexible rubber wall 31 has an integrally molded soft rubber projection 35 projecting over and beyond the flange 15 at each end of the pan 10 and serving as handles for lifting the previously loosened grid 30 and contained ice blocks from the pan 10 without inverting the pan, as shown in Fig. 5.

Figure 4:
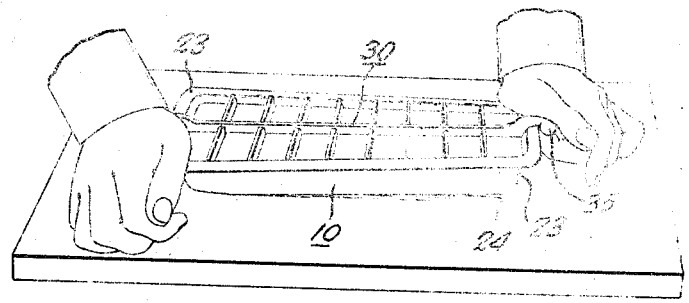
Fig. 4 is a perspective view illustrating the simple method of twisting the flexible pan to loosen its frozen contents therefrom according to this invention.

In operation, the removable flexible rubber grid 30 is set within the metal pan 10 and the pan is filled with water or other substance to be frozen and set within a freezing chamber where the pan contents are frozen solid. Now to remove the ice blocks, pan 10 is removed from its freezing chamber and set upon any flat surface such as a kitchen table, and downward pressure applied at the two corners 21 preferably with the balls of the two hands as shown in Fig. 4. Only a relatively slight pressure is required to free the frozen contents from pan 10 since the first action is merely to flex the corner portions of pan 10 sufficiently to initiate the peeling of the ice contents loose from its frozen bond to the metal pan. After this peeling is once started it easily proceeds progressively throughout the entire area of the bottom wall 11 as well as along the side walls 12 and end walls 13. When the raised areas 20 have been fully depressed until they contact the table surface the entire pan 10 will have taken on a slight twisted distortion as shown in Fig. 4. Here the bottom of the pan at the other two diagonally opposed corners 23 is shown at 24 as raised slightly above the surface of the table. This peculiar elevation of the corners 23 by the operation shown in Fig. 4 is characteristic of the above described metal pan 10.

It will be noted that after the raised areas 20 have been depressed into full contact with the table surface they cannot be further depressed and hence there is a definite limit to the degree of twisting distortion that can be given pan 10 by the operation of Fig. 4. This limit of distortion is so chosen by the degree of elevation of the raised areas 20 that the pan 10 cannot be given a permanent set or twist and hence will always return to its normal shape after the operation of Fig. 4. This is an important feature because if the pan 10 be twisted to such an extent that the main area of its bottom wall 11 does not return to its flat form it will not thereafter rest flat upon its shelf or support in the freezing chamber and hence the rate of freezing in subsequent freezing operations will be very greatly reduced. Any flexible metal freezing pan which is flexed by hand to loosen the ice contents therefrom but has no definite stop to limit its degree of flexure is practically certain to be over-flexed and permanently distorted after a short period of use. The reason for this is the fact that as soon as the ice contents are loosened from the pan it very suddenly becomes much less resistant to the flexing force which consequently must be suddenly terminated or at least reduced at the instant the ice is loosened in order to avoid over-flexure. The pan of this invention obviously avoids this common defect in prior flexible metal freezing trays.

After the ice contents and grid 30 are loosened from the metal pan 10 by the operation shown in Fig. 4, the rubber grid 30 together with the ice contents may be completely removed from pan 10 by lifting up on the rubber handles 35, and the ice blocks thereafter may be easily removed individually with the fingers by picking them out of the open-sided compartments, or the completely flexible rubber grid may be easily twisted with the hands to cause the ice blocks to fall from the grid into a suitable container or dish.

If only a few ice blocks are desired at the time the grid 30 need not be completely removed from pan 10, but can be easily bent so that only a portion of the grid 30 may be lifted from the pan sufficiently high to pick out the desired number of ice blocks therefrom, after which the flexed portion of the grid is returned to its normal position in pan 10 and the pan returned to the freezing chamber. This results in a material saving of the ice blocks. Fig. 5 illustrates how only a portion of the flexible rubber grid 30 may be lifted up to facilitate the removal of only a portion of the ice blocks.

While the embodiment of the present invention as herein disclosed, constitutes a preferred form, it is to be understood that other forms might be adopted, all coming within the scope of the claims which follow.

What is claimed is as follows:

1. A freezing container comprising: a metal pan having a bottom wall and peripheral side walls, said bottom wall being generally flat except at two diagonally opposite corners of said pan where substantial corner areas of said bottom wall slope upwardly to said corners at a distinct angle and thereby clear a flat supporting surface upon which the pan may be set, said metal pan being distortable as a whole by downward pressure upon said diagonally opposite corners thereof.

2. A freezing container comprising: a flexible metal pan having a bottom wall and peripheral side walls, said bottom wall having two diagonally opposite corner areas thereof sloping upwardly to the diagonally opposed corners of said pan at a relatively small angle, said metal pan being so twistable as a whole by vertical downward pressure applied thereto at said diagonally opposite corners as to readily free the frozen bond between said pan and its frozen contents.

3. A freezing container comprising: a metal pan having flexible bottom and side walls of sheet metal, said bottom wall having such substantial corner areas thereof sloping upwardly to the pan corners at a distinct angle to the plane of the main portion of said bottom wall as to render said pan readily distortable as a whole by vertical downward pressure upon the corners thereof when said pan is supported upon a flat surface.

4. A freezing container comprising: a metal pan having flexible bottom and side walls of sheet metal, said bottom wall having such substantial corner areas thereof sloping upwardly to the pan corners at a distinct angle to the plane of the main portion of said bottom wall as to render said pan readily distortable as a whole by vertical downward pressure upon the corners thereof when said pan is supported upon a flat surface, and a removable grid for dividing the frozen contents of said pan into ice blocks.

5. A freezing container comprising: a metal pan having flexible bottom and side walls of sheet metal, said bottom wall having such substantial corner areas thereof sloping upwardly to the pan corners at a distinct angle to the plane of the main portion of said bottom wall as to render said pan readily distortable as a whole by vertical downward pressure upon the corners thereof when said pan is supported upon a flat surface, and a flexible rubber grid member for said pan which readily permits a twisting distortion of the frozen contents as a unit.

6. A freezing container comprising: a flexible pan of generally rectangular shape having a flexible metal bottom wall, said bottom wall having two diagonally opposed corner areas raised above the plane of the main portion of said bottom wall to a greater extent than at the two remaining corners of said pan, whereby said pan may be given a limited twisting distortion as a whole by downward pressure thereon at the two diagonal corners thereof having said raised corner areas.

7. A portable freezing tray adapted for use in household refrigerators, comprising: a flexible metal pan drawn from one piece of flat sheet metal and having a generally flat bottom wall, but having relatively small opposed end areas of said bottom wall slightly raised above the plane of the main portion of said bottom wall, whereby said pan may be given a limited twisting distortion as a whole by downward pressure thereon at two diagonally opposed corners of said pan.

HARVEY D. GEYER.